United States Patent [19]
Tachibana et al.

[11] 3,924,148
[45] Dec. 2, 1975

[54] SMALL SIZE DC MOTORS

[75] Inventors: Kan-ichi Tachibana; Michihiro Nishioka; Mikiya Ono, all of Kitakyushu, Japan

[73] Assignee: Mitsubishi Mining & Cement Company Ltd., Tokyo, Japan

[22] Filed: Nov. 1, 1973

[21] Appl. No.: 411,715

[30] Foreign Application Priority Data
Nov. 15, 1972 Japan............................ 47-113840

[52] U.S. Cl................. 310/220; 338/20; 317/11 R; 317/11 C
[51] Int. Cl.² ...................... H02H 7/08; H02K 13/06; H01R 39/46
[58] Field of Search ........... 310/220, 221, 223, 219, 310/233, 235, 236, 238; 338/20, 21; 264/61; 252/518; 317/11 R, 11 C, 61

[56] References Cited
UNITED STATES PATENTS

| | | | |
|---|---|---|---|
| 2,470,096 | 5/1949 | Eck | 310/220 |
| 3,488,538 | 1/1970 | Hayashi | 310/220 |
| 3,594,598 | 7/1971 | Schaub | 310/220 |
| 3,693,053 | 9/1972 | Anderson | 317/61 |
| 3,764,951 | 10/1973 | Tachibana et al. | 338/20 |

*Primary Examiner*—J. D. Miller
*Assistant Examiner*—Patrick R. Salce
*Attorney, Agent, or Firm*—Edward J. Brenner

[57] ABSTRACT

New small size DC motors comprising as a spark suppressing element a commutator composed of a cylinder-shaped oxide sintered body having a remarkably stable volt-ampere characteristic as a parent body of the commutator and a plurality of metal or alloy pieces as the commutator segments are provided. The spark suppressing element utilizes an electric barrier existing at the contact surface between the oxide sintered body and the metal or alloy pieces, and can suppress the generation of spark between the commutator and the brush completely, thereby making the motor long-lived and also noiseless. Further, this element is easily to be attached and inexpensive in manufacturing cost.

1 Claim, 9 Drawing Figures

SMALL SIZE DC MOTORS

BACKGROUND OF THE INVENTION

This invention relates to a small size DC motor comprising a commutator which can suppress the generation of spark between the commutator and the brush, thereby making the motor long-lived and also noiseless.

Small size DC motors using conventional commutators had a weak point that the commutator and the brush thereof are worn out. In such motors, the rotation of the rotor causes the commutator and the brush to make and break electrically for each rotation, resulting in the discharge of the induction energy accumulated in the windings of the rotor and at the same time the generation of spark between the commutator and the brush. This generation of spark promotes the abrasion of the commutator and the brush as described hereinabove. Further, a generation of electric noises is due to this spark. As countermeasures for such spark phenomenons, as shown in FIG. 1–FIG. 3, methods for decreasing a spark current flowing between the commutator and the brush by connecting two commutator segments 1, 1 by such an element as a resistance 3, a condenser 4 or a SiC varistor 5, have been practically used. In these conventional methods, however, when the resistance 3 or the condenser 4 is used as FIG. 1 or FIG. 2, there increases a current consumption owing to the parallel arrangement of the resistance 3 or the condenser 4 and the winding 2. And when SiC varistor 5 is used as FIG. 3, the generation of spark can be suppressed without almost increasing the current consumption owing to the characteristic of the varistor that the resistance thereof is high at low voltage and decreases quickly as the voltage increases, but, as FIG. 3 shows, for example, in cast three elements are connected to the commutator segments respectively, such operations as soldering, adhesion and the like are required for adhering these elements to the winding part separately. Further, a weight balance between these three elements is to be taken into consideration.

This invention has been devised to overcome the defects of the conventional small size DC motors as described hereinabove.

BRIEF SUMMARY OF THE INVENTION

A primary object of this invention is to provide a small size DC motor which suppresses the generation of spark between the commutator and the brush completely.

Another object of this invention is to provide a small size DC motor which generates no noise and has a long life.

A further object of the invention is to provide a small size DC motor which is inexpensive to manufacture.

According to this invention, there is provided a small size DC motor comprising a commutator composed of a cylinder-shaped oxide sintered body, said oxide sintered body having negative resistance and also possessing the resistivity $R_0 K\Omega$ cm at 273°K and the thermister constant B°K that satisfy the relation $R_0 \times B \leq 10,000 K\Omega$ cm.°K, and metal or alloy pieces attached to the plural points of the surface of said cylinder-shaped oxide sintered body respectively, said metal or alloy pieces being highly anticorrosive and having a high electric conductivity.

The features of the small size DC motor of this invention are as follows:

1. the spark suppressing mechanism is based on the utilization of an electric barrier existing at the surface of an oxide sintered body used as a parent body of the commutator, said electric barrier having a remarkably stable volt-ampere characteristic, making the spark suppressing effect complete.
2. the spark suppressing element is easily to be attached and necessitates no excessive space.
3. the manufacturing cost is very low.

The above and further objects and novel features of the invention will more fully appear from the following detailed description when the same is read in connection with the attached drawings.

BRIEF DESCRIPTION OF THE ATTACHED DRAWINGS

FIG. 7 (b) is a front view of the commutator of FIG. 7 (a).

Figure 4:
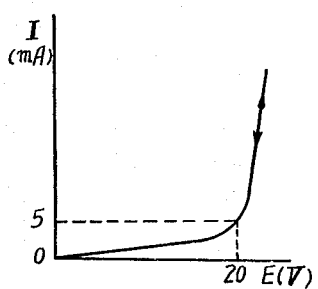
FIG. 4 is a volt-ampere characteristic suitable for a varistor.
Figure 6:
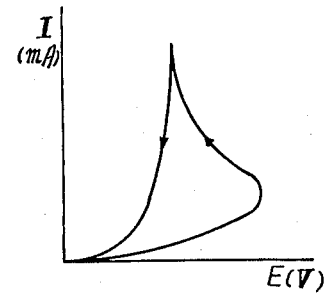
FIG. 6 is a volt-ampere characteristic unsuitable for a varistor.

In FIG. 4 and FIG. 6, voltage E is plotted as abscissa and current I as ordinate.

Figure 7:
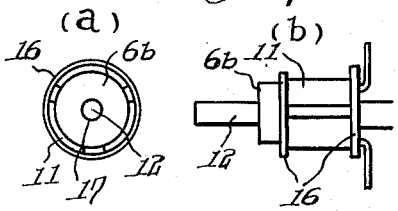
FIG. 7 (a) is a side view of a commutator composed of a cylinder-shaped oxide sintered body, metal or alloy pieces and a plastic ring, attached to a rotary shaft.
Figure 8:
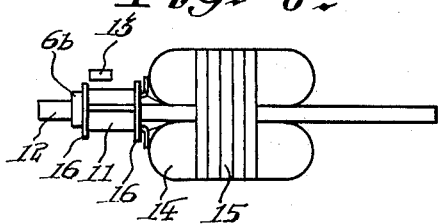

FIG. 8 is a rotor made by using the commutator of FIG. 7.

Figure 9:
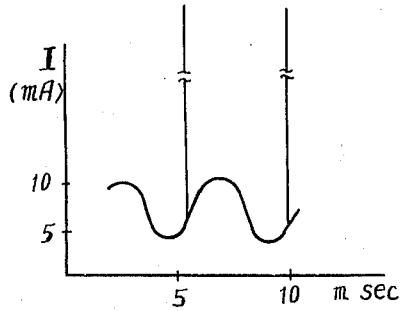
Figure 9:
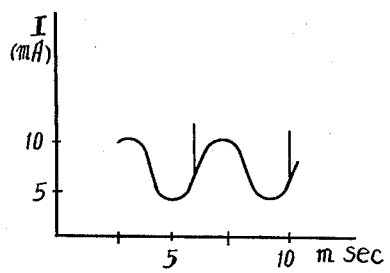

FIG. 9 shows a wave form of the current of a motor given by an oscilloscope, (a) a motor using no spark suppressing element, (b) a motor using the commutator of this invention.

DETAILED DESCRIPTION OF THE INVENTION

This invention relates to the improvement of a small size DC motor comprising using respectively a cylinder-shaped oxide sintered body as a parent body of the commutator and metal or alloy pieces as the commutator segments, bringing the cylinder-shaped sintered body in contact with the metal or alloy pieces for making a contact surface therebetween formed, and utilizing a volt-ampere characteristic of the contact surface for suppressing the generation of spark between the commutator and the brush. In general, an electric barrier, that is, a barrier resistance is formed at the surface of an oxide sintered body having properties as a semiconductor. The inventors have found out that in case such oxide sintered body is brought in contact with metal or alloy pieces and a voltage is applied to the metal or alloy pieces as electrodes, when the voltage exceeds a definite value, said barrier resistance decreases remarkably and then the volt-ampere characteristic becomes as shown in FIG. 4. The object of this invention is to suppress the generation of spark of a small size DC motor by utilizing this characteristic. The volt-ampere characteristic of the element is, as shown in FIG. 4, similar to that of a varistor.

The oxide sintered bodies as a parent body of the commutator used in this invention, as described hereinabove, have negative resistance and also possess the thermister constant B°K and the resistivity $R_0 K\Omega$cm at 273°K that satisfy the relation $R_0 \times B \leq 10,000 K\Omega$ cm.°K and are, for example, preferably sintered bodies of the mixtures such as iron oxide and copper oxide, cobalt oxide and nickel oxide, iron oxide and titanium oxide etc. On the other hand, the metal or alloy segments which are highly anticorrosive and have a high electric conductivity are preferably such metals as copper, zinc, nickel etc, or such alloys as brass, phosphor bronze, German silver etc. Therefore, the components of the commutator of this invention are both inexpensive in cost.

As the element of this invention utilizes an electric barrier existing at the surface of the sintered body, that is, a barrier resistance, a threshold voltage thereof is stabilized and shows almost no scatter, as compared with those of SiC varistor and others which utilize a contact resistance between solid particles, therefore the quality thereof is also very stable.

$B$ and $R_0$ as described hereinabove are given by the following equation.

$$R = R_0 \exp \left[ B \left( \frac{1}{T} - \frac{1}{273} \right) \right] \quad (1)$$

$B$ is the thermister constant (°K), and $R_0$ is the resistivity (KΩcm) at $T = 273°K$.

The volt-ampere characteristic of such a varistor as shown in FIG. 4 can be approximated by the following equation.

$$I = I_0 \left( \frac{V}{V_0} \right)^\alpha \quad (2)$$

where $I$ is the current flowing through the varistor, $V$ is the voltage accross the varistor, $V_0$ is the voltage applied to the opposite surfaces of the varistor at $I = I_0$ mA, that is, a threshold voltage, and $\alpha$, an index representing non-linearity, is usually 3-5.

Figure 5:
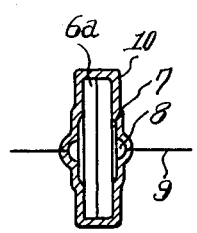
FIG. 5 is an element made by superposing two oxide sintered bodies.

It is a necessary condition for obtaining an excellent nonlinear resistance that $R_0 = B$ of an oxide sintered body is smaller than 10,000KΩcm.°K, as shown concretely in the undermentioned Example. And such a non-linear resistivity generating at the contact surface between the oxide sintered body and the metal or alloy piece is based, as described hereinabove, on the barrier resistance formed at the surface of said oxide sintered body. Namely, the volt-ampere characteristic of the contact resistance element made by superposing such two sintered bodies and baking a silver electrode on the either side thereof respectively as shown in FIG. 5 shows the same change as that of FIG. 4 and the value of $\alpha$ of the equation (2) is stably about 5. This sintered body is the same one as used in the undermentioned Example. When an electrode is merely brought in ohmic contact with such a sintered body in order to measure $R_0$, $R_0$ obeys Ohm's law, showing 0.01-0.5KΩcm according to the composition of the sintered body. From these facts, the inventors have found out that an electric barrier existing at the surface of such an oxide sintered body as described above generates non-linear resistance characteristic. On the other hand, when $R_0 \times B$ is larger than 10,000KΩcm.°K, the volt-ampere characteristic becomes unstable as shown in FIG. 6. This is due to the fact that when the current increases, the calorific value of said sintered body increases in proportion to $RI^2$, and when $B$ increases, the decrease of the resistance owing to the rising of the temperature becomes sharp.

Namely, it has been found out that the larger $R_0 \times B$ is, the worse the volt-ampere characteristic becomes. Further, the small size DC motor of this invention is characterized in that neither baking of electrodes nor soldering of lead wires for attaching this element is necessary and no additional parts are also required, because this motor is constructed in such a manner that the insulating part of the parent body of a conventional commutator is substituted simply by this element. Therefore, the small size DC motor of thie invention does not necessitate to consider such a weight balance between these elements as required for attaching conventional spark suppressing elements. Consequently, these advantages, coupled with the low material costs, enable the manufacturing cost to decrease remarkably.

Referring to FIG. 7 and FIG. 8, there will be explained a preferred embodiment of this invention. A cylinder-shaped sintered body $6b$ as shown in FIG. 7 is prepared by a conventional technique. Then, a rotor is assembled by fixing commutator segment 11 made of copper etc. to the sintered body $6b$ by use of a plastic ring 16 and attaching the sintered body $6b$ to a rotary shaft 12 of the motor with an insulating adhesive agent 17. In this case, it is necessary to use a sintered body that shows such a volt-ampere characteristic as shown in FIG. 4. According to an oscilloscope, a wave form of the current of a conventional small size DC motor which can not suppress the generation of spark is as shown in FIG. 9 $(a)$, while that of the current of the small size DC motor of this invention using such a rotor as FIG. 8 becomes as shown in FIG. 9 $(b)$, showing that the generation of spark is completely suppressed. In FIG. 8, 13 is a brush.

This invention, as described hereinabove, provides a small size DC motor which is inexpensive to manufacture and contains a spark suppressing element which can make the motor long-lived and noiseless, therefore this invention is industrially of great value.

The invention will be understood more readily with reference to the following example. However, the example is intended to illustrate the invention and is not to be construed to limit the scope of the invention.

EXAMPLE

Each starting material in the composition defined in Table 1 is respectively mixed in a pot mill so as to produce a homogeneous mixture. The mixture is dried in a dryer, pressed in a mold at a pressure of about 1,000kg/cm², and sintered in the air at a temperature higher than 1,000°C, thus there is obtained the sintered body $6a$ or $6b$ as shown in FIG. 5 or FIG. 7 respectively. As FIG. 5 shows, a silver electrode 7 is baked on one side of the disk-like sintered body $6a$, and a lead wire 9 is attached to the silver electrode 7 with solder 8, and the whole is coated with epoxy resin 10. Further, as FIG. 7 $(a)$ and $(b)$ show, copper pieces 11 as commutator segments are fixed to the cylinder-shaped sintered body $6b$ by use of a plastic ring 16, and vinyl acetate adhesive agent 17 as an insulating adhesive agent is applied to a gap between the sintered body $6b$ and the rotary shaft 12. In these cases, a surface barrier exists at the contact surface between two sintered bodies $6a$, $6a$ superposed as shown in FIG. 5 or at the contact surface between the sintered body $6b$ and the copper pieces 11 as shown in FIG. 7, consequently a high resistance $R_1 K\Omega$ is obtained at the low voltage and the current changes as the voltage increases, as shown in FIG. 4. The contact resistance element is made in such a way as FIG. 5, and the measured values of $R_1$, $V_0$ and $\alpha$ thereof are shown in Table 1. Further, the resistivity $R_0 K\Omega$ cm of the sintered body 6a measured in a conventional manner, together with the thermister constant $B°K$ and $R_0 \times B$ thereof are also shown in Table 1.

Table 1

| Sample No. | I | II | III | IV |
|---|---|---|---|---|
| $Fe_2O_3$ (mol%) | 66 | 50 | 40 | 34 |
| CuO (mol%) | 34 | 50 | 60 | 66 |
| $R_0$ (KΩcm) | 0.5 | 0.1 | 0.04 | 0.01 |
| B (°K) | 2100 | 1900 | 1100 | 1500 |
| $R_1$ (KΩ) | 20 | 19 | 17 | 16 |
| $V_0$ (V) | 19 | 18 | 16 | 15 |
| $\alpha$ (—) | 5 | 5 | 4 | 4 |
| $R_0 \times B$ (KΩcm.°K) | 1050 | 190 | 44 | 15 |

Figure 1:
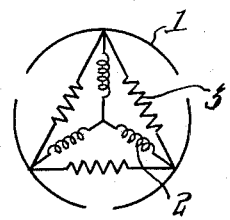
FIG. 1–FIG. 3 show connection equivalent circuits including resistances, condensers or varistors respectively.
Figure 2:
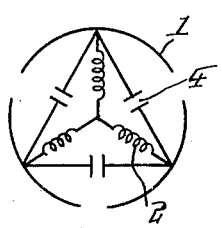
Figure 3:
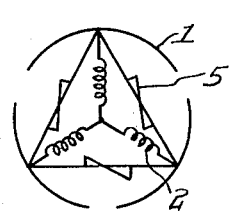

As Table 1 shows, the values of $R_0 \times B$ of the samples I – IV are all not more than 10,000KΩ cm.°K. And each contact resistance element made by superposing the two disc-like sintered bodies 6a, 6a as shown in FIG. 5 or by bringing the metal or alloy pieces 11 in contact with the cylinder-shaped sintered body 6b as shown in FIG. 7. shows a remarkably stable volt-ampere characteristic and is suitable for a varistor. As FIG. 7 shows, the commutator composed of the cylinder-shaped sintered body 6b as a parent body of the commutator, the copper pieces 11 as commutator segments, and the plastic ring 16 is attached to the rotary shaft 12 by use of vinyl acetate adhesive agent 17 as an insulating adhesive agent. Then, as FIG. 8 shows, a rotor is made by assembling said commutator, winding 14 and iron core 15. In this case, the commutator segments 11 and the winding 14 are electrically connected in such a circuit as shown in FIG. 3.

For comparison with the above-mentioned Example, the samples V–VIII are prepared by using the starting materials in the composition defined in Table 2. The values of $R_0$, B and $\alpha$ of these samples V–VIII measured in the same manner as the above-mentioned Example are shown in Table 2.

Table 2

| Sample No. | V | VI | VII | VIII |
|---|---|---|---|---|
| $Fe_2O_3$ (mol%) | 80 | 0 | 0 | 50 |
| $MnO_2$ (mol%) | 0 | 80 | 66 | 0 |
| CoO (mol%) | 20 | 20 | 34 | 50 |
| $R_0$ (KΩcm) | 1000 | 1000 | 10 | 6 |
| B (°K) | 4500 | 4500 | 6000 | 3500 |
| $R_1$ (KΩ) | 2100 | 2000 | 30 | 25 |
| $V_0$ (V) | — | — | — | — |
| $\alpha$ (—) | — | — | — | — |
| $R_0 \times B$ (KΩcm.°K) | $4.5 \times 10^6$ | $4.5 \times 10^6$ | $6 \times 10^4$ | $2.1 \times 10^4$ |

As Table 2 shows, the values of $R_0 \times B$ of the samples V–VIII are all larger than 10,000KΩ cm.°K. Especially, the samples V and VI, the resistances thereof being high, can not suppress the generation of spark even when attached to the motor, and the samples VII and VIII, the resistances thereof being low owing to the self-heating as shown in FIG. 6, can suppress the generation of spark, but increases the current when attached to the motor.

What is claimed is:

1. A small size DC motor comprising a commutator composed of a cylinder-shaped oxide sintered body having a barrier resistance at its surface, said oxide sintered body having negative resistance and also possessing the resistivity $R_0 K\Omega$cm at 273°K and the thermistor constant $B°K$ that satisfy the relation $R_0 \times B \leq 10,000$ KΩcm.°K, and metal or alloy pieces attached to the plural points of the surface of said cylinder-shaped oxide sintered body respectively, said metal or alloy pieces being highly anticorrosive and having a high electric conductivity.

* * * * *